United States Patent [19]

Tellert

[11] Patent Number: 4,971,183

[45] Date of Patent: Nov. 20, 1990

[54] DEVICE FOR THE AUTOMATIC ACTUATION OF A FRICTION CLUTCH

[75] Inventor: Rudy Tellert, Werneck/Rundelshausen, Fed. Rep. of Germany

[73] Assignee: Sachs Systemtechnik GmbH, Schweinfurt, Fed. Rep. of Germany

[21] Appl. No.: 255,738

[22] Filed: Oct. 11, 1988

[30] Foreign Application Priority Data

Nov. 7, 1987 [DE] Fed. Rep. of Germany ....... 3737899

[51] Int. Cl.⁵ .................... B60K 41/02; B60K 41/22; B60K 41/28
[52] U.S. Cl. .............................. 192/0.033; 192/0.076; 192/3.55; 192/3.63; 192/103 R
[58] Field of Search ................. 192/0.092, 0.096, 3.63, 192/3.62, 3.55, 103 R, 0.033, 103 C, 0.076

[56] References Cited

U.S. PATENT DOCUMENTS

| 4,343,387 | 8/1982 | Hofbauer | 192/0.076 |
| 4,403,682 | 9/1983 | Norris et al. | 192/0.033 |
| 4,509,625 | 4/1985 | Tellert | 192/0.033 |
| 4,651,855 | 3/1987 | Grunberg | 192/0.032 |

FOREIGN PATENT DOCUMENTS

| 0243195 | 10/1987 | European Pat. Off. | 192/0.096 |
| 0250228 | 12/1987 | European Pat. Off. | 192/0.096 |
| 2080910 | 2/1982 | United Kingdom | 192/103 R |

Primary Examiner—Rodney H. Bonck
Attorney, Agent, or Firm—Toren, McGeady & Associates

[57] ABSTRACT

A device for automatic actuation of a friction clutch in the transmission line of a motor vehicle between an internal combustion engine and a change-speed gear, including a setting drive system for positioning a clutch releaser of the friction clutch in dependence upon an ideal-position signal, an engine rotation rate sensor which generates an engine rotation rate signal corresponding to the rotation rate of the internal combustion engine, a sensor device generating a gear rotation rate signal corresponding to the input rotation rate of the change-speed gear, and a control system responding to the engine rotation rate sensor and controlling the setting drive system for the engagement and disengagement of the clutch, the control system, for the engagement of the clutch in the starting of the motor vehicle, generates the ideal position signal according to a predetermined characteristic in dependence upon the engine rotation rate signal, and increases the ideal-position signal, in dependence upon the engine rotation rate signal, by a proportion of the gear rotation rate signal which corresponds to a predetermined fraction of the gear input rotation rate.

6 Claims, 1 Drawing Sheet

DEVICE FOR THE AUTOMATIC ACTUATION OF A FRICTION CLUTCH

BACKGROUND OF THE INVENTION

The invention relates to a device for the automatic actuation of a friction clutch in the transmission line of a motor vehicle between an internal combustion engine and a change-speed gear.

From U.S. Pat. No. 4,509,625 a device for the automatic actuation of a friction clutch in the transmission line of a motor vehicle between an internal combustion engine and a change-speed gear is known in which the clutch releaser of the friction clutch is positioned by an electric setting drive. The setting drive responds to an ideal-position signal of a control system which engages and disengages the clutch in dependence upon the working conditions of the motor vehicle. In starting driving in first gear or reverse gear the position of the clutch releaser is set in proportion to the rotation rate of the internal combustion engine. The higher the engine rotation rate is, the more the clutch is shifted, starting from a position of commencing torque transmission, into a position in which it is completely engaged. In this way the engagement of the clutch can be controlled by way of the position of the accelerator pedal. In the higher gears the clutch is engaged with predetermined setting speed of its clutch releaser. Since normally at higher rotation rates and at higher driving speed changing is effected into the higher gears, it is possible by predetermining a constant setting speed to obtain a sufficiently jerk-free clutch behavior in changing into a higher gear.

However problems can arise in changing down from a higher gear into the lower gear, since the friction clutch ordinarily has a progressive characteristic, that is there is no linear connection between the position of the clutch releaser and the torque transmitted by the clutch. In clutch engagement after changing down ordinarily the engine rotation rate is lower than the input rotation rate of the change-speed gear. If the clutch is engaged by means of the control system, then the engine will be accelerated by the gearing. According to the progressive characteristic of the clutch, the rotation rate increases initially only slightly, but finally very greatly. An undesired clutch engagement jerk occurs.

The present invention now shows a way in which such a clutch engagement jerk, occuring especially in changing down, can be avoided.

SUMMARY OF THE INVENTION

According to the invention the control system detects the speed of variation of the engine rotation rate in clutch engagement and regulates the setting speed of the setting drive system so that the speed of variation of the engine rotation rate does not exceed a predetermined limit value. In this way, in ranges of low progression of the clutch, the setting speed of the clutch releaser can in most cases be increased, which leads to a shortening of the engagement time, while in ranges of high progression clutch jerk is prevented. Thus not only is clutch engagement effected more smoothly and comfortably, but also the clutch wear is reduced, and critical driving situations are avoided in which, for example on a slippery road, skidding of the vehicle could occur due to too rapid clutch engagement.

The control system is expediently formed so that it regulates the ideal-position signal of the setting drive system in dependence upon the speed of variation of the engine rotation rate, that it cannot only retard or halt the movement of the setting drive system, but if necessary can also reverse it into the disengagement direction, if this is required by the maintenance of the maximum speed of variation predetermined by the limit value.

The limit value of the speed of variation is expediently fixed in dependence upon the gear engaged in the change-speed gear, and increases towards higher gears.

In the automatic clutch actuation device as known from U.S. Pat. No. 4,509,625 the friction clutch is set into its completely disengaged position if the driving speed of the motor vehicle amounts to less than a predetermined value for example of 2 km/h and at the same time the accelerator pedal is not actuated, that is is situated in its idling or rest position. This clutch disengagement condition, monitored with the aid of a speed sensor and of a powersetting sensor of the internal combustion engine, ensures that in braking of the vehiclele to a halt the clutch is automatically disengaged and stalling of the engine is prevented. Admittedly if under this clutch disengagement condition the vehicle is rolling downhill and in doing so accelerates above the threshold speed at which the clutch engagement operation is started, the vehicle will be strongly braked by the engaging clutch, so that the speed also drops again below the threshold speed leading to clutch disengagement. Fluctuations in the transmission occur which are detrimental to driving comfort.

From a further viewpoint the invention, in an automatic clutch actuation device of the kind as known from U.S. Pat. No. 4,509,625 ensures that transmission fluctuations and jerks which are detrimental to comfort, when the vehicle is rolling at low speed, are prevented.

The features of this improvement are of importance in connection with an actuation device as described above but also have significance independently of the features of the actuation device as described above.

In order to avoid transmission line vibrations when the vehicle is rolling with the clutch disengaged it is ensured that in the commencement of rolling the clutch is already so far engaged that it can transmit the static braking moment of the internal combustion engine if the input shaft rotation rate of the gearing, resulting by reason of the engaged gear ratio when the vehicle is rolling, is equal to the idling rotation rate of the engine. For this purpose a proportion derived from the gear input shaft rotation rate is added to the guide value, derived in starting from the engine rotation rate, for the engagement of the clutch, thus the guide value is over-increased by a proportion dependent upon the speed of travel. Despite the fact that the engine is working with idling rotation rate, thus in the commencement of rolling the clutch is already partially set in the engagement direction and accordingly the engine is smoothly accelerated therewith. Due to the slow rise of the speed of travel and of the engine rotation rate, the dynamic brake moment (the flywheel mass) of the engine and of the transmission is small, so that no torque peaks are stimulated in the transmission. It has appeared suitable to superimpose upon the engine rotation rate a proportion of one sixteenth to one third of the gear input shaft rotation rate, preferrably about one fourth of the gear input shaft rotation rate. The gear input shaft rotation rate can here be detected directly on the gear input shaft; however it can also be ascertained from the signal, representing the driving speed, of a driving speed sensor or tachometer, multiplied by a gear transmission ratio factor fixed by the gear setting.

The superimposition of a gear rotation rate proportion upon the engine rotation rate-dependent guide value of the clutch engagement operation has furthermore the advantage that when the vehicle is rolling an effect similar to that of a torque converter results. The vehicle can for example roll on the level with the accelerator pedal not actuated, in a gear suitable for starting driving, with the clutch substantially engaged, since the gear rotation rate proportion of the guide valve keeps the clutch engaged. The clutch is however closed only so far that just the slight rolling moment is transmitted. Slight braking brings the vehicle to a halt and the clutch is completely disengaged.

In this connection a further improvement is obtained if the relationship between the "engine rotation rate" guide value and the ideal-position signal controlling the setting drive system is made steeper in a rotation rate range adjoining the idling rotation rate, that is it has a higher first differential quotient after the engine rotation rate than in a range thereto adjoining towards higher engine rotation rates. The first differential quotient in the upwardly adjoining range determines the tendency to vibration of the transmission and therefore cannot be selected with indeterminate steepness. The steeper branch of the characteristic curve adjoining the idling rotation rate is on the other hand made milder by the smoother part of the characteristic curve of progression of the lining springs of the friction clutch and shortens not only the clutch engagement time but also the rotation rate limit at which the clutch engages completely in the starting program.

A further aspect of the invention concerns problems of an automatic clutch actuation device of the kind as known from U.S. Pat. No. 4,509,625 which can arise in driving at low speed, especially in parking or the like. With the clutch actuation device of U.S. Pat. No. 4,509,625 the clutch is completely disengaged if the driving speed, without actuation of the accelerator pedal, drops below a predetermined speed value for example of 2 km/h. On actuation of the accelerator-pedal in a gear suitable for starting driving, for example first, second or reverse gear, the clutch is engaged according to the engine rotation rate resulting from the accelerator pedal actuation. If the accelertor pedal is released, complete clutch disengagement is immediatley effected if the driving speed still falls short of the driving speed threshold. The engagement action following in the case of renewed actuation of the accelerator pedal requires time, the delay requiring habituation, since under these circumstances the driver tends to give more acceleration than necessary.

Under a further aspect of the invention, in an automatic clutch actuation device of the kind as known from U.S. Pat. No. 4,509,625 ensures that the clutch reacts more rapidly in driving at very low speed.

The features of this improvement are of importance in connection with automatic clutch actuation devices having features departing from devices as described above.

While with the known automatic clutch actuation device the clutch is completely disengaged at low driving speeds if the accelerator pedal is released, now it is ensured that the disengagement movement of the clutch on release of the accelerator pedal is not executed completely, but initially only into a releaser position in which the clutch is just beginning to transmit torque (slipping point). When the accelerator pedal is released the clutch remains for a time period for example of two seconds at the slipping point, before it is shifted further into the completely disengaged position. On renewed actuation of the accelerator pedal within the predetermined time period the clutch begins, starting from the slipping point, to engage without delay and reacts without jerking to changes in the accelerator pedal position.

In the case of the automatic clutch actuation device according to U.S. Pat. No. 4,509,625 the clutch is engaged independently of the momentary rotation rate of the gear input shaft. In changing down to too low a gear therefore engine damage can occur if the engine were to be accelerated to rotation rates above the permissible by the engagement of the clutch. Attempts have been made to prevent engine damage of this kind by ascertaining the gear input shaft rotation rate and blocking clutch engagement if the gear input rotation rate is higher than the maximum permissible engine rotation rate. This however has the consequence that during the time of blockage of clutch engagement the vehicle rolls without engine braking, which can lead, especially downhill, to critical situations.

Under a further aspect of the invention engine damage due to excessive rotation rates is to be prevented, without however endangering the operational safety of the vehicle.

The features of this aspect too are of importance independently of the features of the above mentioned clutch actuation devices.

In the case of this improvement commencement is made from the engine rotation rate. The clutch engagement operation is not however completely prevented at a gear input rotation rate lying above the maximum permissible engine rotation rate, but the clutch is engaged only until the engine rotation rate has reached its maximum permissible value. In this way engine damage is prevented without the need to forgo the braking action of the engine. While under these conditions the clutch is thermally loaded, there is however no fear of damage since for the one part the time period in which it is undesirably driven under these conditions is normally very short and for the other part the vehicle is rapidly braked, even by only partial engagement of the clutch, to speed values at which the clutch can close completely.

Yet a further aspect of the invention concerns the simplification of the controlling of a vehicle equipped with an automatic clutch actuation device of the kind as known from U.S. Pat. No. 4,509,625. Ordinarily for parking the vehicle a gear also suitable for starting driving, for example first or second gear or reverse gear, is engaged as security against rolling away. To start up the engine hitherto the ignition key had to be turned into the "ignition on" position, whereupon the clutch actuation device controlled the friction clutch into the disengaged position. With the clutch disengaged it was possible then to disengage the gear engaged for security against rolling away, and to set the change-speed gear into the neutral position. Only now was it possible for the ignition key to be turned into the starter position. A catch prevents the possibility of switching on the starter in one of the starting gears, in order to prevent the vehicle moving away immediately on starting of the engine with the accelerator pedal actuated.

Under this further aspect of the invention, in an automatic clutch actuation device of the kind as known from U.S. Pat. No. 4,509,625 ensures that the engine of the vehicle can be started up with the change-speed gear in any gear ratio position, in order that the ignition key does not have to be handled a plurality of times for the starting operation.

The features of this improvement are of importance in connection with an actuation device as described above but also have significance independently of features of the device as described.

In the starting up of the engine in the case of this improvement memory is set independently of the gear ratio set on the change-speed gear, and in the set condition prevents clutch engagement. The memory is reset by the actuation of the gear-change lever, whether for the engagement of a driving-starting gear or even only by "symbolic" or partial actuation of the gear lever contact. Multiple letting go and regrasping of the ignition key by the driver is however not necessary.

The various features of novelty which characterize the invention are pointed out with particularity in the claims annexed to, and forming a part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

An example of embodiment of the invention will be explained in greater detail hereinafter by reference to a drawing, wherein.

DESCRIPTION OF PREFERRED EMBODIMENTS

Figure 1:
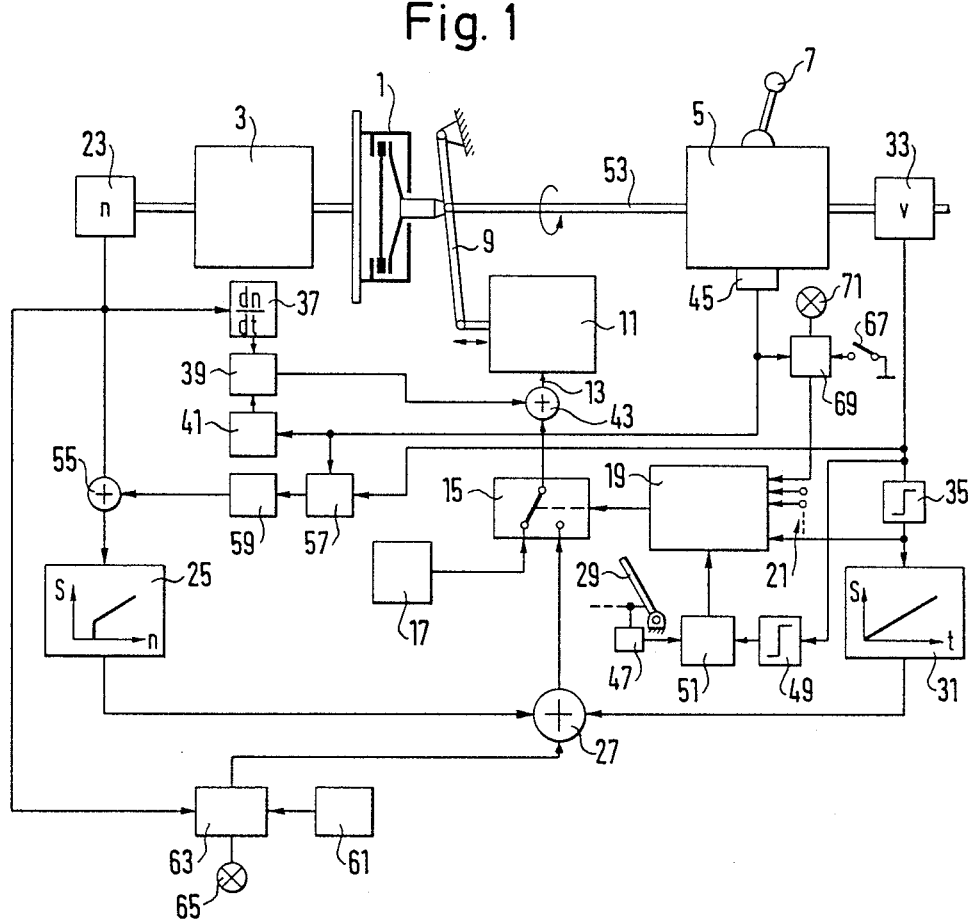
FIG. 1 shows a block circuit diagram of a device according to the invention for the automatic actuation of a friction clutch in the transmission line of a motor vehicle and FIG. 2 shows a diagram which shows the relationship between an ideal-position signal S and the rotation rate n of the internal combustion engine of the motor vehicle, utilized in starting driving for the control of the releaser position of the friction clutch.

FIG. 1 shows a block circuit diagram of a device for the automatic actuation of a friction clutch 1 in the transmission line of a motor vehicle between an internal combustion engine 3 and a change-speed gear 5, the gear position of which is selectable by means of a gear-change lever 7. The clutch 1 is of conventional construction and has a clutch releaser 9 which is settable by a setting drive system 11, according to an ideal position signal supplied at 13, to a releaser position determined by the ideal-position signal. The position is here regulated in dependence upon a comparison of ideal and actual values.

For the release of the clutch 1 an ideal-position signal which sets the clutch releaser 9 into the disengagement position of the clutch 1 is fed to the setting drive system 11 through an electronic controllable switch 15 from a signal source 17. The switch 15 is controlled by a clutch disengagement control system 19 which responds to a plurality of clutch disengagement conditions which occur in driving and necessitate clutch disengagement. Corresponding signal emitters or sensors are connected to inputs 21 of the clutch disengagement control system 19. By way of example the clutch disengagement is initiated by actuation of a gear-change lever contact on touching of the gear lever 7. For a further clutch disengagement condition the rotation rate of the internal combustion engine 3 is monitored by means of a rotation rate sensor 23 and the clutch 1 is disengaged if the rotation rate is lower than the idling rotation rate. Thus it is ensured that clutch disengagement is effected when the vehicle is braked to a halt.

The clutch engagement operation is controlled in dependence upon the gear setting of the gearing 5. For starting driving a first function generator 25 is provided which generates the ideal-position signal S controlling the setting drive 11, in dependence upon the engine rotation rate n according to a predetermined characteristic. The ideal-position signal S is fed by way of an adding stage 27 and the switch 15 to the input 13 of the setting drive 11. With actuation of an accelerator pedal indicated at 29, with the vehicle stationary, the clutch release conditions are cancelled and the switch 15 is connnected with the adding stage 27 while disconnecting the source 17 delivering the disengagement ideal-position signal. The engine rotation rate n, corresponding to the position of the accelerator pedal, through the function generator 25 fixes the ideal-position signal and thus the releaser position of the clutch 1.

In order to take account of the changed clutch conditions when the vehicle is moving, in addition the output signal of a second function generator 31 is fed to the adding stage 27, which generator 31 works independently of the first function generator 25 and generates a time-dependent ideal-position signal, the speed of variation of which is constant. The function generator 31 is triggered in dependence upon the speed of travel of the vehicle. For this purpose a rotation rate sensor 33 responding for example to the drive-output rotation rate of the gearing 5 is provided which, through a threshold stage 35, or comparator triggers the clutch engagement program of the function generator 31 when the drive-output rotation rate of the gearing 5 and thus the driving speed lie above a predetermined value. The clutch 1 is completely engaged even if the engine rotation rate n, at low driving speed with high gear engaged, does not suffice to permit the clutch to engage completely. In the changing of the higher gears the clutch 1 is time-dependently controlled substantially by the function generator 31.

Further details of the clutch actuation device as explained above are explained in U.S. Pat. No. 4,509,625 to which reference is made in this connection. Improvements of this clutch actuation device will be described hereinafter.

To the engine rotation rate sensor 23 there is connected a circuit 37 which delivers a signal, corresponding to the speed dn/dt of variation of the engine rotation rate n, to a regulator circuit 39 which compares the speed of variation signal with a threshold signal delivered by a stage 41 and so corrects the ideal-position signal, through a summing stage 43 in the path of ideal-position signal, that on engagement of the clutch the value of the threshold signal is not exceeded by the value of the speed of variation of the engine rotation rate. In this way the engagement movement of the clutch 1 is controlled so that the threshold value predetermined for the speed of variation of the engine rotation rate n is not exceeded The increase of engine rotation rate per unit of time is limited, and jerky accelerations of the engine, such as can occur especially in changing down of the gears due to the rotation of the gear input shaft at higher rotation rate than the internal combustion engine 3, as a result of the progressive characteristic curve of the clutch 1, are avoided.

The threshold values generated by the stage 41 are dependent upon the gear setting of the gearing 5. For this purpose the stage 41 is connected to a sensor 45 which detects the gear setting of the gearing 5. Suitable values can be ascertained by driving experiments and permit a compromise between reduction of the clutch wear and improvement of the comfort and safety, since excessively rapid clutch engagement on a slippery road can lead to skidding. Suitable threshold values lie for example at 380 min$^{-1}$ per second for the first and reverse gear,
at 762 min$^{-1}$ per second for second gear and
at 1525 min$^{-1}$ per second for third to fifth gears.

Admittedly the above values are only approximate values.

One of the disengagement conditions covered by the disengagement control system 19 is fulfilled if the accelerator pedal 29 is situated in its rest position and the driving speed detected by the rotation rate sensor 33 is less than 1.5 km/h. The accelerator pedal rest position is detected by a sensor 47, and a threshold stage 49 or comparator detects driving speeds of less than 1.5 km/h. A control system 51 responding to the sensor 47 and the threshold stage 49 comprises a time delay device which triggers the disengagement control system 19 with the beginning of the coincidence of the accelerator pedal rest position and understepping of the speed threshold detected by the threshold stage 49. The time delay device delivers the disengagement condition only after the elapse of a predetermined time period for example of 2 seconds in which the accelerator pedal 29 has been situated uninterruptedly in the rest position and the vehicle has moved at less than 1.5 km/h. During the time period of 2 seconds the clutch remains at its slipping point, that is in a releaser position of commencing torque transmission. A corresponding ideal-position signal can be delivered by the control system 51 to the setting drive 11. Since the clutch 1 does not disengage completely on temporary release of the accelerator pedal, but remains at the slipping point, it can engage more quickly and react without jerk to renewed actuation of the accelerator pedal. This is advantageous especially in shunting (a maneuver involving slow forward and backward driving) and-parking.

In starting driving in a starting gear, for example first or second or reverse gear, the clutch 1 is engaged by means of the function generator 25 in dependence upon the engine rotation rate n, the engine rotation rate being determined by the position of the accelerator pedal 29. If however acceleration is effected not by engine power but by commencement of rolling on a downward slope with the starting gear engaged, but without actuation of the accelerator pedal 29, the rotation rate of the input shaft 53 of the gearing 5 can increase even above the idling rotation rate of the internal combustion engine 3, at which the internal combustion engine 3 is working on account of non-actuation of the accelerator pedal 29. If the vehicle accelerates above the speed threshold set on the threshold stage 35, then the clutch 1 is time-dependently engaged by means of function generator 31. Since the vehicle is braked by the engagement and the clutch may be opened again, undesired transmision vibrations can occur. In order to avoid transmission vibrations of this kind, the engine rotation rate signal of the rotation rate sensor 23, forming the guide value signal for the function generator 25, is increased in a summing stage 55 by a proportion dependent upon the rotation rate of the gear input shaft 53. The function generator 25 delivers an ideal-position signal which already partially engages the clutch 1 for the transmission of the static brake moment of the internal combustion engine 3 even before the input shaft rotation rate of the gearing 5 reaches the idling rotation rate of the internal combustion engine 3. Thus the driving speed and the engine rotation rate n rise comparatively slowly so that the dynamic brake moment remains small due to the flywheel mass of the internal combustion engine 3 and of the transmission, and no torque peaks stimulating the transmission into vibrations result.

In the circuit arrangement according to FIG. 1 the input shaft rotation rate of the gearing 5 is detected not directly on the gear input shaft 53, but from the rotation rate signal of the rotation rate sensor 33 in an arithmetic stage 57 by multiplication with a factor selected according to the gear setting of the gearing 5. The arithmetic 57 is here controlled by the sensor 45 which detects the gear position. A multiplier 59 multiplies the gear input rotation rate signal, to be fed to the summing stage 55, with a factor between one sixteenth and one third, preferably 0.25.

If the function generator 25 delivers for example an ideal-position signal S which at an idling rotatioan rate of 700 min$^{-1}$ keeps the clutch completely disengaged, at a rotation rate of about 800 min$^{-1}$ engages the clutch so far that it can transmit a slight torque and at a rotation rate of 900 min$^{-1}$ transmits a torque which can already propel the vehicle, then on superimposition of one quarter of the gear rotation rate on the guide value the following situation arises:

With the gear input shaft stationary at the idling rotation rate of the engine of 700 min$^{-1}$ the clutch is disengaged, and no moment is transmitted. If by depressing of the accelerator pedal with the vehicle stationary the engine rotation rate is increased to 800 min$^{-1}$ the clutch will just engage and transmit a slight moment. The same relationships also arise if the engine is rotating at an idling rotation rate of 700 min$^{-1}$ and the gear input shaft is already rotating at about 350 min$^{-1}$ with the vehicle rolling. The guide value of the function generator 25 has grown to 788 min$^{-1}$, so that the clutch is just pulling. A further acceleration of the vehicle, with the engine at idling rotation rate, to a speed of travel at which the input shaft 53 of the gearing is rotating at about 800 min$^{-1}$ leads to a guide value for the function generator 25 of 900 min$^{-1}$, whereby the clutch is engaged so far that a brake moment halting the vehicle can be transmitted by the engine.

With the vehicle rolling without actuation of the accelerator pedal an effect known from torque converters occurs which permits the vehicle to roll, in one of the starting gears with accelerator pedal not actuated, substantially without clutch slip. However the clutch is engaged only so far that it can transmit the slight rolling moment. Slight braking brings the vehicle to a halt and completely disengages the clutch.

Figure 2:
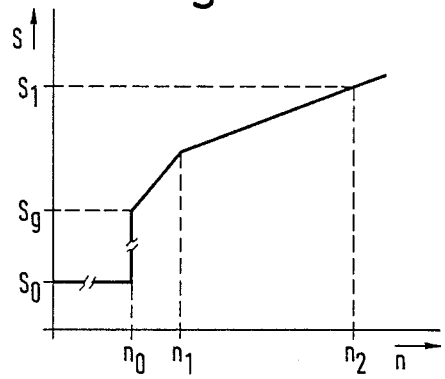

FIG. 2 shows details of the ideal-position signal engine rotation rate characteristics of the function generator 25. At rotation rates n below the idling rotation rate $n_0$ of the internal combustion engine 3 the ideal-position signal has the value $S_0$ at which the clutch 1 is completely disengaged. If due to actuation of the accelerator pedal 29 the rotation rate n, rises above the idling rotation rate $n_0$, the ideal-position signal jumps very rapidly, compensating the releaser play, to a limit value $S_g$, at which the torque transmission of the clutch 1 begins. In an adjoining first rotation rate range up to a rotation rate $n_1$ for example of 1200 min$^{-1}$ the rise of the curve, that is the first differential quotient ds/dn, is comparatively high and reduces above the rotation rate $n_1$ to a second value. In the second range the characteristic varies linearly to a rotation rate $n_2$ at which the clutch is completely engaged corresponding to the ideal-position signal $S_1$. The rise of the second range determines the tendency to vibration of the transmission, at high rotation rates. Due to the comparatively steep range $n_0$ to $n_1$ however, utilizing the progression of lining springs of the clutch 1, the setting time of the clutch is reduced and also the rotation rate $n_2$ necessary for the complete engagement of the clutch is reduced, compared with a characteristic curve rising flatly in the entire range.

The clutch actuation device prevents engine damage due to excessive rotation rates such as can occur for example due to the fact that the clutch 1 engages completely in operational situations in which, due to engagement of too low a gear, the gear input shaft 53 is rotating at a gear input rotation rate lying above the maximum permissible engine rotation rate. The maximum permissible value of the engine rotation rate, predetermined by a stage 61, is compared by a regulating stage 63 with the actual value of the engine rotation rate n. If the engine rotation rate n lies above the maximum permissible rotation rate, then the regulating stage 63, through the adding stage 27, corrects the ideal-position signal driving the clutch 1 in the engagement direction to a value at which the maximum permissible rotation rate is not exceeded. The internal combustion engine 3 is thereby accelerated to the maximum permissible rotation rate, but the vehicle, utilizing the braking moment of the internal combustion engine 3, is retarded to values at which the clutch 1 can engage completely. A warning device 65 controlled by the regulating stage 63 indicates the unacceptable operational situation, so that the input rotation rate to the gearing can be reduced by gear-changing. The occurence of the operational situations in which the clutch 1 cannot be engaged due to the selection of too low a gear is however prevented.

The internal combustion engine of the motor vehicle is started up by means of an ignition lock switch indicated at 67. The ignition lock switch 67 has in the conventional but not further illustrated manner several switch contacts and in a first position switches on the ignition of the internal combustion engine and in a second position switches on the starter. In order, in the actuation of the ignition lock switch between the first position and the second position, not to have to disengage the starting gear ordinarily set in the gearing 5 as security against rolling away, a memory circuit 69 is provided which, irrespective of the gear set in the gearing 5, is set in the switching on of the ignition and in the set condition disengages the clutch 1 by means of the disengagement control system 19. The clutch disengagement condition is maintained by the setting of the memory circuit 69 even in the subsequent starting of the internal combustion engine 3. The memory circuit 69 is reset and thus the clutch disengagement condition is cleared when subsequently the gear-change lever 7 and thus its contact are actuated, or when the sensor 45 ascertains that no gear, or a gear not intended for starting driving, for example the third, fourth of fifth gear, is engaged. A warning device 71 indicates, when the memory circuit 69 is set, that the starting barrier, by which immediate starting of driving is to be prevented in the starting of the internal combustion engine 3, is in existence. The driver must then either engage a starting gear or at least "symbolically" or partially move the gear change lever 7 to simulate a switching operation which triggers clutch actuation. The operation of the motor-vehicle is however simplified as a whole, since the internal combustion engine 3 can be started up in every gear setting.

While specific embodiments of the invention have been shown and described in detail to illustrate the application of the inventive principles, it will be understood that the invention may be embodied otherwise without departing from such principles.

What I claim is:

1. A device for the automatic actuation of a friction clutch in the transmission line of a motor vehicle between an internal combustion engine and a change-speed gear, comprising:
    a setting drive system (11) for the positioning of a clutch releaser (9) of the friction clutch (1) in dependence upon an ideal-position signal (S),
    an engine rotation rate sensor (23) which generates an engine rotation rate signal corresponding to the rotation rate of the internal combustion engine (3),
    and a sensor device (33, 45, 57) generating a gear rotation rate signal corresponding to the input rotation rate of the change-speed gear (5),
    a control system (19, 25, 31) responding to the engine rotation rate sensor (23) and controlling the setting drive (11) for the engagement and disengagement of the clutch (1),
    wherein said control system, for the engagement of the clutch (1) in the starting of the motor vehicle, generates the ideal position signal (S) according to a predetermined characteristic in dependence upon the engine rotation rate signal, and increases the ideal-position signal (S), in dependence upon the engine rotation rate signal, by a proportion of the gear rotation rate signal which corresponds to a predetermined fraction of the gear input rotation rate.

2. A device according to claim 1, wherein the predetermined fraction lies between one sixteenth and one third, preferably at about one quarter of the gear input rotation rate.

3. A device according to claim 1, wherein the control system (25, 31) generates the ideal-position signal (S) indirectly proportional dependence upon the engine rotation rate signal, and wherein the ideal-position signal (S) varies in a first rotation rate range ($n_0$ to $n_1$), adjoining the idling rotation rate in the direction of increasing rotation rate, with a first value of its first order differential quotient, with respect to the engine rotation rate, and in a second rotation rate range ($n_1$ to $n_2$), adjoining the first rotation rate range ($n_0$ to $n_1$), with further increasing engine rotation rate varies with a second value of the first order differential quotient with respect to the engine rotation rate, lower than the first value.

4. A device for the automatic actuation of a friction clutch in the transmission line of a motor vehicle between an internal combustion engine and a change-speed gear, comprising:
    a setting drive (11) for the positioning of a clutch releaser (9) of the friction clutch (1) in dependence upon an ideal-position signal (S), an engine rotation rate sensor (23) detecting the rotation rate of the internal combustion engine (3), a speed sensor (33) detecting the speed of driving of the vehicle, a power setting sensor (47) detecting a rest position of a power setting element 29 of the internal combustion engine (3) and a control system (19, 25, 31) controlling the setting drive (11) for the engagement and disengagement of the clutch (1), wherein said control system (19, 25, 31) generates the ideal-position signal (S) for the engagement of the clutch (1) in accordance with a predetermined ideal position signal-rotation rate characteristic in dependence upon the rotation rate detected by the engine rotation rate sensor (23), and generates the ideal-position signal (S) for the disengagement of the clutch (1) when the speed sensor (33) detects a vehicle speed below a predetermined value and at the same time the power setting sensor (47) detects the rest position of the power setting element (29)

and wherein said control system (19, 25, 31), at the beginning of the coincidence of the conditions that the vehicle speed is less than the predetermined value and the power setting element (29) is situated in the rest position, generates for the disengagement of the clutch (1) a position signal (S) which sets the setting drive (11) to a position of commencing torque transmission of the clutch (1) and controls the setting drive (11), after the elapse of a predetermined time period in which the coincidence exists uninterruptedly, into a position entirely disengaging the clutch (1).

5. A device according to claim 4, wherein the predetermined value of the vehicle speed amounts to about 1.5 km/h and the predetermined time period amounts to about 2 sec.

6. A device for the automatic actuation of a friction clutch in the transmission line of a motor vehicle between an internal combustion engine and a change-speed gear comprising a setting drive (11) for the positioning of a clutch releaser (9) of the clutch (1), a sensor (45) detecting the position of a gear-change lever (7) of the change-speed gear (5) and generating on actuation of the gear-change lever (7) a signal initiating the disengagement of the clutch (1) and a control system (19, 25, 31) controlling the setting drive (11) for the engagement and disengagement of the clutch (1) in dependence upon the position of the gear-change lever (7), wherein said control system (19, 25, 31) in the starting of the internal combustion engine (3) controls the setting drive (11) into a position completely disengaging the clutch and sets a memory (69) which in the set condition generates a blocking signal preventing engagement of the clutch (1) and wherein said sensor (45) clears the memory (69) on actuation of the gear-change lever (7) or when the gear-change lever (7) is situated in the neutral position or the position of third or a higher gear.

* * * * *